United States Patent Office 2,781,948
Patented Feb. 19, 1957

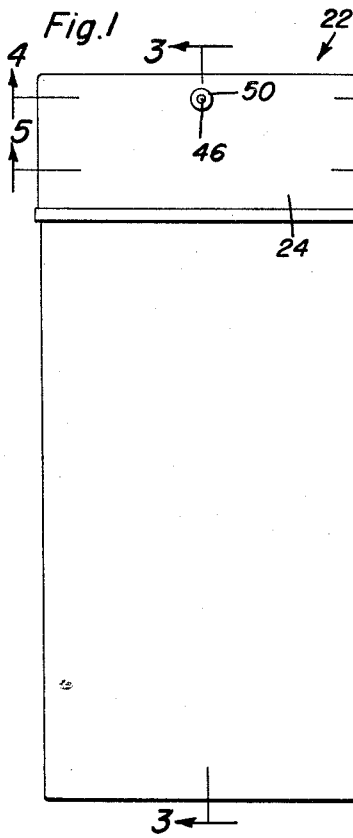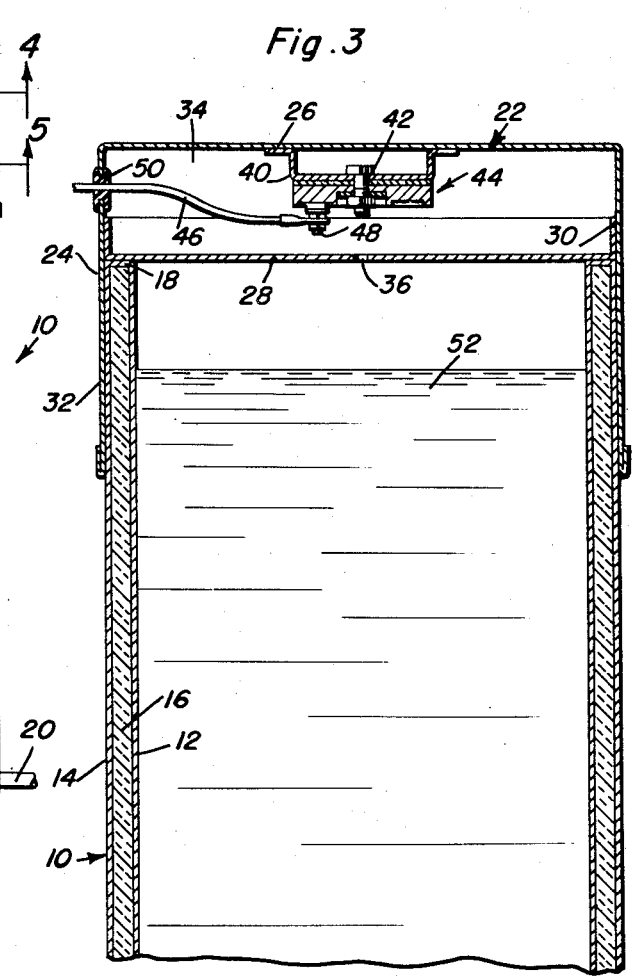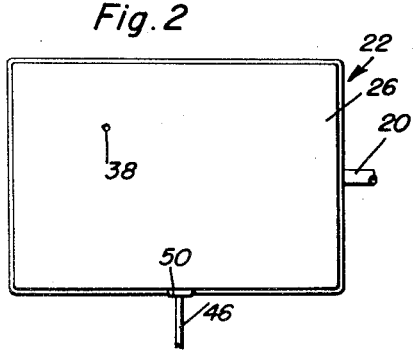

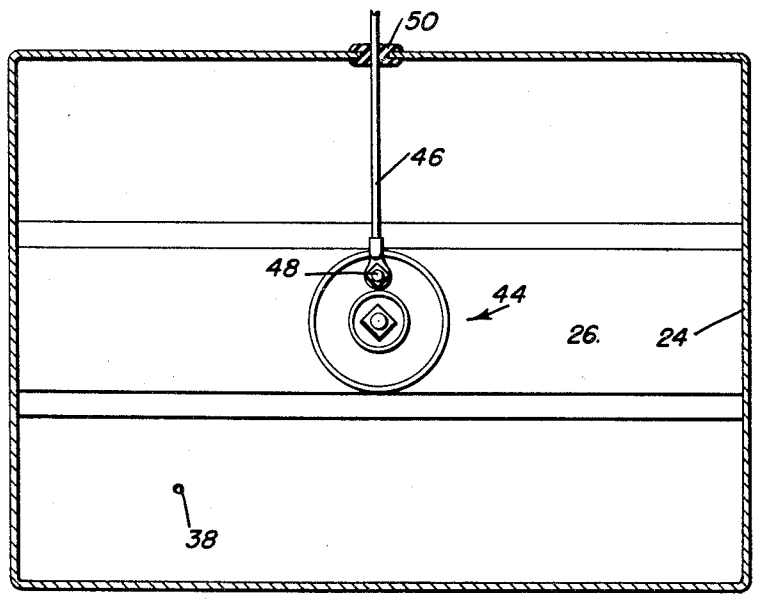
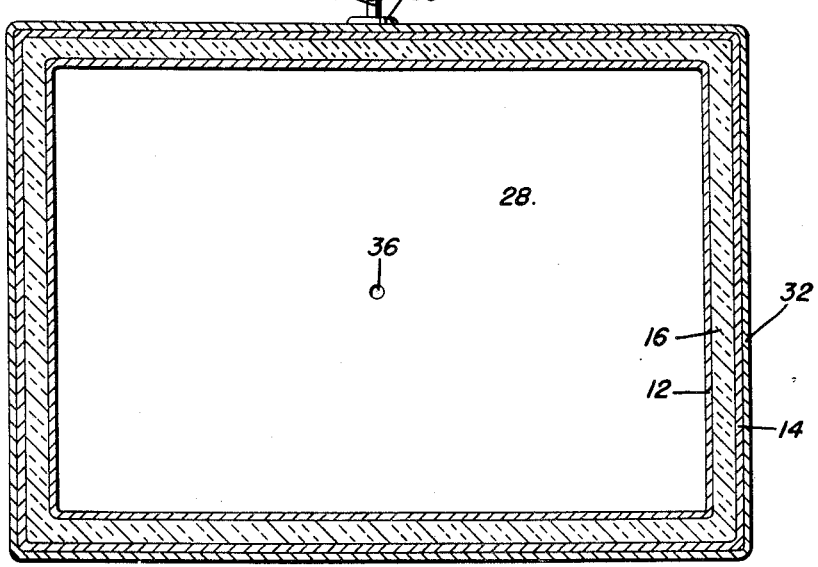

2,781,948

HEAT BARRIER CONTAINER WITH MEANS TO SUPPLY TEMPERED GAS TO REPLACE DISCHARGED TEMPERED LIQUIDS

Robert A. Emmons, Omaha, Nebr., assignor to S & L Sales, Inc., Omaha, Nebr., a corporation of Nebraska Application September 20, 1954, Serial No. 457,229

13 Claims. (Cl. 222—1)

This invention relates generally to insulating devices and has for its primary object the provision of an insulating cap member for utilization specifically with liquid containers, and more particularly containers for storing hot coffee.

When hot coffee is to be stored in a receptacle for a long period of time, while coffee is periodically dispensed therefrom, it is conventional practice to provide a source of external heat to the coffee container for the purpose of maintaining a palatable drinking temperature. However, this method has its attendant disadvantages, namely, the coffee becomes strong, cloudy and bitter due to the prolonged application of direct heat to the coffee. Similarly, the provision of a submerged heating element or for that matter any direct application of heat to the brewed coffee causes a rapid deterioration of its quality, and it has therefore been a serious problem in the brewing and dispensing of coffee to maintain a quantity of coffee at the proper temperature over a period of time without detracting from its qualities of taste.

It is therefore a primary object of this invention to provide a heat sealing or retaining cap member for utilization in conjunction with coffee containers, which will maintain coffee at a desired temperature without detracting from its taste quality or causing rapid deterioration of its quality to obviate the tendency of the coffee to become strong, cloudy or bitter.

It is a further object of this invention to provide a heat sealing cap for coffee containers in which heat is applied indirectly to the coffee and wherein heat is also applied to the outside of the container in which the coffee is maintained to provide a heat barrier thereat, and wherein a heat barrier is provided over the open top of the container to not only indirectly heat the coffee but also to prevent the evaporation thereof and consequent loss of quality.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing a coffee container and the associated heat insulating cap;

Figure 2 is a top plan view of the assembly shown in Figure 1;

Figure 3 is an enlarged vertical section taken substantially along the plane indicated by section line 3—3 of Figure 1;

Figure 4 is an enlarged transverse section taken substantially along the plane of section line 4—4 in Figure 1; and Figure 5 is an enlarged horizontal section taken substantially along the plane of section line 5—5 of Figure 1.

Referring now more particularly to the drawings, reference numeral 10 indicates generally a coffee container which may be of any desired shape, the embodiment shown being rectangular in cross section, but it is to be understood that a cylindrical shape or other forms could be utilized with equal advantage. The container itself as will be seen in Figure 3 consists of an inner wall construction 12 and an outer wall construction 14 which are separated by a layer of insulating material 16, it being understood that the container has a closed bottom portion and that its top end is open in the manner shown, the two wall members 12 and 14 being physically connected at their upper ends by the edge portion 18. The container is provided adjacent its bottom with an outlet conduit 20 for the purpose of dispensing coffee from the container. At this point, it may be well to mention that the particular container shown is of the type which is conventionally used in conjunction with coin operated coffee dispensers wherein the outlet conduit 20 leads to coin controlled valve mechanism for dispensing the coffee, the manner of dispensing forming no part of this invention and hence not being shown.

The heat insulating or retaining cap indicated generally by the reference character 22 will be seen to consist of a body member comprised of a tubular wall portion 24 open at one end and having a cover plate portion 26 closing its opposite end in the manner shown. The partition wall member 28 is secured between the opposite ends of the tubular wall portions 24, and for this purpose the partition wall may be provided with a peripheral flange 30 deformed laterally thereof which will incage the inner surface of the wall 24 such that it may be easily secured thereto by any conventional fastening means or methods. As will be seen most clearly in Figure 3, the partition wall 28 forms a stop for the cover member 22 when the same is applied to the container 10. That is, the partition wall 28 is adapted to engage the edge member 18 of the container in the manner illustrated. The skirt portion 32 of the wall 24 which is below the partition wall 18 is of such dimensions as to snugly engage the outer surface of the outer wall 14 of the container, but in such a manner as to be easily removed therefrom when this is necessary. A chamber or space 34 is formed between the partition wall 28 and the cover plate portion 26 of the cap, and the partition wall, as well as the cover plate portion 26, are each provided with a small aperture such as those illustrated by the reference characters 36 and 38, respectively, whereby the chamber 34 is in communication simultaneously with the interior of the container 10 and with the surrounding atmosphere exterior of the container and cover assembly. The purpose of this construction will be presently apparent.

A pedestal or mounting member 40 is secured to the undersurface of the cover plate portion 26, and suitably secured thereon as by fastening bolt member 42 is a heating element assembly indicated generally by the reference character 44. An electrical connector 46 is secured to a suitable connector post or posts 48 of the heating element, and the connector extends therefrom outwardly of the cover assembly 22 through an opening in the side wall thereof which is sealed by the grommet member 50. The heating element may be of any conventional construction but preferably takes the form of a length or coil of highly resistant wire.

The use in the operation of the device is as follows: the coffee 52 after having been brewed is placed in the container 10 and the cover assembly 22 placed in position on the open end thereof. The snug engagement of the skirt portion 32 of the cover 22 is such as to provide a good conduction of heat between the skirt portion and the outer wall 14. The heating element 44 is supplied with a suitable source of current through the conductor 46, and the heating element will create a high temperature condition within the chamber 34 which will, of course, be conducted therefrom to the skirt portion 32 and consequently to the outer wall 14, enhancing the heat insulating effect of the container itself. Further, the hot air within the chamber 34 provides an insulating blanket between the exposed surface of the coffee 52 and the surrounding atmosphere which will prevent loss of heat therefrom and will indirectly heat the coffee 52 by heating the air above the coffee but within the container 10. Still further, it will be apparent that when the coffee is dispensed through the outlet conduit 20, the volume dispensed will be displaced by hot air from the chamber 34, this displacement being permitted by reason of the small aperture 36 provided for this purpose. Of course, the air displaced then from the chamber 34 will be replenished from the outside atmosphere through the aperture 38 in the cover plate member 26 of the assembly 22. It will be appreciated that the air above the disposed surface of the coffee 52 within the container 10 will therefore be maintained in a relatively high temperature and will supply heat to the coffee 52 itself. A further effect of the blanket of hot air within the chamber 34 is that evaporation from the exposed surface of the coffee is reduced to a minimum since as a practical matter no air will flow outwardly from within the container by reason of the fact that only two small apertures are provided, one in each of the partition wall and the cover plate portion 26.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A heat retaining cap for liquid receptacles, comprising a generally tubular body member having one end open, an end plate portion covering the other end of said body member, a partition wall disposed between the opposite ends of said body member such as to provide at the open end thereof a skirt adapted to be snugly engaged upon an upper open end of an associated liquid receptacle, and a chamber between said partition wall and said end plate portion, each of said partition wall and said end plate portion being provided with a small aperture, and a heating element secured within said chamber.

2. An insulated liquid receptacle, comprising a container having inner and outer heat-conducting side walls defining an open top, insulating material disposed between said side walls, an insulating cap for said container, said cap including a heat-conducting skirt portion snugly embracing said outer side wall at the open upper end of the container, a partition wall engaging the upper edge of said container and a cover plate portion disposed in spaced relation to said partition wall to define a chamber therewith, a heating element mounted within said chamber, said partition wall and said cover plate each being provided with a small aperture whereby the chamber is in communication with the interior of the container and with the surrounding atmosphere.

3. In a dispenser for materials needing temperatures modified from those around them, comprising: a container for the material to be dispensed, a discharge outlet for the container, a chamber having an air inlet opening and having an air outlet opening connected into the container, so that as the contents are discharged from the container air is delivered through the chamber outlet into the container to replace the contents, the air passing through the chamber, being delivered into the chamber through the chamber inlet to replace that delivered into the container, and air tempering means in the chamber adapted to change the temperature of the air in the chamber, the tempering means being located with respect to the inlet and outlet of the chamber to temper the air brought into the chamber before it is delivered into the container.

4. The dispenser of claim 3 wherein the chamber is at the outside of and contiguous to the container, and a wall of the container constitutes a wall separating the contents of the container from the chamber and is in contact with the air in the chamber, so that the chamber separates that wall of the container from the outside air.

5. In a dispenser for liquids: a container having a discharge outlet therein, means to deliver tempered gas to the container to occupy space above the liquid, including gas tempering means and a chamber wherein the tempering means tempers the gas, means connecting the chamber to a source of the gas, and means connecting the chamber to the container, so that tempered gas is delivered to the container when liquid is withdrawn therefrom.

6. The dispenser of claim 5, wherein the tempering means comprises a heater, and the gas delivered to the container is heated.

7. The dispenser of claim 6, wherein the chamber is contiguous to and outside of a wall of the container and provides a means to separate that wall of the container from the outside air, and wherein the gas is air, and the means connecting the chamber to a source of gas is a port open to atmosphere.

8. In a method of dispensing tempered liquid from a container, the step of providing a supply of air separate from the liquid and tempering the air to a temperature different from atmospheric temperature while separate from the liquid so as to avoid tempering the liquid in the container by direct application of tempering from a heat changing element in contact with the liquid and delivering tempered air from the supply into the container as liquid is withdrawn therefrom.

9. The method of claim 8, including the step of changing the temperature of the air in the supply from ambient temperature by a greater amount that that desired for the liquid, so that the air may produce a heat change in the liquid.

10. A method of dispensing from a container hot liquids such as hot coffee, comprising the steps of providing a supply of air separate from the coffee and heating the same while separate so as to avoid heating the coffee in the container by direct application of heat from a heater, and delivering heated air from the supply to the container to replace the liquid dispensed therefrom.

11. The method of claim 10, wherein the air in the chamber is maintained at a temperature above that of the liquid in the container, so as to supply heat to the liquid when the air is delivered into the container.

12. In a dispenser for liquids: a container having a discharge outlet therein, means to deliver tempered air to the container to occupy space above the liquid, including air tempering means and a chamber wherein the tempering means tempers the air, means whereby the chamber may receive air from the outside, and means connecting the chamber to the container, so that tempered air is delivered to the container when liquid is withdrawn therefrom.

13. The dispenser of claim 12, wherein the chamber is outside the container and contiguous to a wall thereof, whereby the tempered air in the chamber may control heat loss through the container wall.

References Cited in the file of this patent

UNITED STATES PATENTS

| 1,207,505 | Cordley | Dec. 5, 1916 |
| 1,774,996 | Rohrmann | Sept. 2, 1930 |

FOREIGN PATENTS

| 639,172 | Great Britain | June 21, 1950 |